United States Patent
Yuuki

(10) Patent No.: US 7,272,292 B2
(45) Date of Patent: Sep. 18, 2007

(54) OPTICAL CABLE FIXING STRUCTURE

(75) Inventor: Hayato Yuuki, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/968,974

(22) Filed: Oct. 21, 2004

(65) Prior Publication Data

US 2005/0105875 A1    May 19, 2005

(30) Foreign Application Priority Data

Oct. 21, 2003    (JP)    ............... P2003-360197

(51) Int. Cl.
*G02B 6/00*    (2006.01)
(52) U.S. Cl. .................... 385/137; 385/136
(58) Field of Classification Search ............ 385/136, 385/137
See application file for complete search history.

(56) References Cited

U.S. PATENT DOCUMENTS

| | | | | |
|---|---|---|---|---|
| 4,327,964 A | * | 5/1982 | Haesly et al. ............ | 385/78 |
| 4,415,232 A | * | 11/1983 | Caron .................... | 385/84 |
| 4,865,412 A | * | 9/1989 | Patterson ............... | 385/71 |
| 4,986,625 A | * | 1/1991 | Yamada et al. .......... | 385/55 |
| 5,044,719 A | * | 9/1991 | Nakamura ............... | 385/76 |
| 5,315,684 A | * | 5/1994 | Szegda .................. | 385/139 |
| 5,425,120 A | * | 6/1995 | Peterson et al. ......... | 385/87 |
| 5,452,386 A | | 9/1995 | van Woesik | |
| 5,590,230 A | * | 12/1996 | Cheng .................... | 385/77 |
| 5,638,477 A | * | 6/1997 | Patterson et al. ........ | 385/99 |
| 5,835,652 A | * | 11/1998 | Yagi et al. .............. | 385/87 |
| 6,081,642 A | | 6/2000 | Asada | |
| 6,174,091 B1 | | 1/2001 | Herrmann | |
| 6,179,480 B1 | * | 1/2001 | Bella et al. ............. | 385/76 |
| 6,203,211 B1 | * | 3/2001 | Cheng .................... | 385/78 |
| 6,325,549 B1 | * | 12/2001 | Shevchuk ............... | 385/86 |

FOREIGN PATENT DOCUMENTS

JP    A 2001-235654    8/2001

* cited by examiner

*Primary Examiner*—Michelle Connelly-Cushwa
*Assistant Examiner*—Rhonda S. Peace
(74) *Attorney, Agent, or Firm*—Oliff & Berridge, PLC

(57) ABSTRACT

Respective stoppers are engaged with a jacket at positions along a longitudinal direction of an optical cable different from each other by using a plurality of the stoppers having pairs of engaging pieces arranged in parallel with each other by an interval dimension smaller than a width dimension of the jacket of the optical cable. Further, positions of engaging the pairs of engaging pieces and the jacket may be shifted from each other by a quarter periphery in a peripheral direction of the optical cable for the respective stoppers.

11 Claims, 4 Drawing Sheets

OPTICAL CABLE FIXING STRUCTURE

CROSS-REFERENCE TO RELATED APPLICATION

The invention claims priority to Japanese Patent Application No. JP 2003-360197 filed on Oct. 21, 2003. The disclosure of the prior application is incorporated herein by reference in its entirety.

BACKGROUND OF THE INVENTION

1. Field of Invention

The invention relates to a technology for fixing an optical cable used as an optical signal transmitting part in a vehicular optical communication system or the like.

2. Description of Related Art

As a technology of fixing an optical cable to an optical connector or an optical plug, particularly, as a technology of fixing an optical cable applied to use of an automobile, the main current is a technology of covering a ring-like member made of a metal to an optical cable to calk. Otherwise, there are a technology of making a metal piece in a U-like shape bite a jacket of an optical cable to fix, a technology of welding to bond an optical cable fixing part and an optical cable cover by using laser welding and the like.

Meanwhile, in using an optical cable in a vehicle, there is a concern of exerting a sudden external force to the optical cable in integrating or in using the optical cable. Therefore, in fixing the optical cable, there is needed a sufficient strength capable of withstanding such a sudden external force.

However, according to the above-described technologies, in order to solidly hold the optical cable, it is necessary to operate a large compression force or the like to an optical fiber per se of the optical cable. Further, when the large compression force or the like is operated thereto, there is produced a strain by compression at the optical fiber per se to increase light loss. Therefore, according to the above-described technologies, it is difficult to make a reduction in light loss and an increase in a fixing strength compatible with each other.

Hence, there is a technology of fixing an optical cable by forming a positioning slit having a width dimension slightly smaller than a dimension of a diameter of the optical cable constituting a positioning object and using a stopper formed with edge portions at end edge portions of an opening of the positioning slit.

According to the stopper, there is constructed a constitution in which the edge portions cut a jacket of an optical cord and both side portions of the positioning slit are fitted to engage with the cut portions and therefore, a compression force is difficult to be operated to the optical fiber per se. Therefore, there is achieved an advantage of capable of making a reduction in light loss and a fixing strength compatible with each other.

Such a stopper is disclosed in JP-A-2001-235654.

SUMMARY OF THE INVENTION

Meanwhile, particularly, in use of a vehicle, there is requested small-diameter formation of an optical cable in order to achieve light-weighted formation, compact formation or the like of the optical cable. In this case, small-diameter formation of the optical fiber per se is difficult and therefore, generally, there is a tendency of achieving thin-wall formation of a jacket.

However, the above-described stopper is basically constructed by a constitution of cutting the jacket and engaging the stopper to the cut portion and therefore, when the jacket is thinned, a sufficient fixing strength is difficult to achieve.

Hence, it is an object of various embodiments of the invention to provide a cable fixing portion structure capable of fixing an optical cable with a sufficient strength.

In order to resolve the above-described problem, according to an aspect of the invention, there is provided an optical cable fixing portion structure for fixing an optical cable in which an outer surrounding of an optical fiber is covered with a jacket, the optical cable fixing portion structure including: a plurality of stoppers having pairs of engaging pieces arranged in parallel with each other at an interval dimension smaller than a width dimension of the jacket. The pairs of engaging pieces are engaged with both side portions of the jacket by being pressed in a direction substantially orthogonal to an axial direction of the optical cable while pressing the pairs of engaging pieces to the both side portions of the jacket; the pairs of engaging pieces of the respective stoppers are engaged with the both side portions of the jacket at positions different from each other along a longitudinal direction of the optical cable; and positions of engaging the pairs of engaging pieces and the jacket differ from each other in a peripheral direction of the optical cable at the respective stoppers.

The stoppers are preferably arranged adjacent to each other in the longitudinal direction of the optical cable.

The respective pairs of engaging pieces preferably include blade portions having edges configured by intersecting inner side faces thereof opposed to each other and front or leading end faces thereof disposed on front end sides in a direction of pressing the pairs of engaging pieces to the both side portions of the jacket, and the blade portions cut into the jacket by pressing the pairs of engaging pieces to the both side portions of the jacket and the engaging pieces are engaged with the jacket by bringing portions of the inner side faces opposed to each other of the engaging pieces to the cut into portions.

According to various exemplary embodiments of the invention, the positions of engaging the pairs of engaging pieces and the jacket differ from each other in the peripheral direction of the optical cable for the respective stoppers and therefore, a force of fixing the jacket is dispersed in the peripheral direction and the optical cable can be fixed with a sufficient strength. Particularly, even when the respective stoppers are proximately arranged, the force of fixing the jacket by the respective stoppers is dispersed in the peripheral direction of the jacket and therefore, the optical cable fixing portion structure is effective in that the optical cable can be fixed with a sufficient strength.

Further, according to some exemplary embodiments of the invention, the plurality of stoppers are contiguously arranged in the longitudinal direction of the optical cable and therefore, compact formation of a structure a portion of fixing the structure can be achieved.

Further, according to some exemplary embodiments of the invention, the respective pairs of engaging pieces include the blade portions configured by the inner side faces opposed to each other and the front end faces disposed on the front end sides in the direction of pressing the pairs of engaging pieces to the both side portions of the jacket and by pressing the pairs of engaging pieces to the both side portions of the jacket, the blade portions cut into the jacket and by bringing the portions of the inner side faces opposed to each other of the engaging pieces to the cut into portions, the engaging pieces are engaged with the jacket and therefore, optical loss can be reduced by avoiding a compression force operating on the optical fiber.

BRIEF DESCRIPTION OF THE DRAWINGS

These and other objects and advantages of this invention will become more fully apparent from the following detailed description taken with the accompanying drawings in which.

DETAILED DESCRIPTION OF EXEMPLARY EMBODIMENTS

An explanation will be given an optical cable fixing portion structure according to an exemplary embodiment of the invention as follows.

Figure 1:
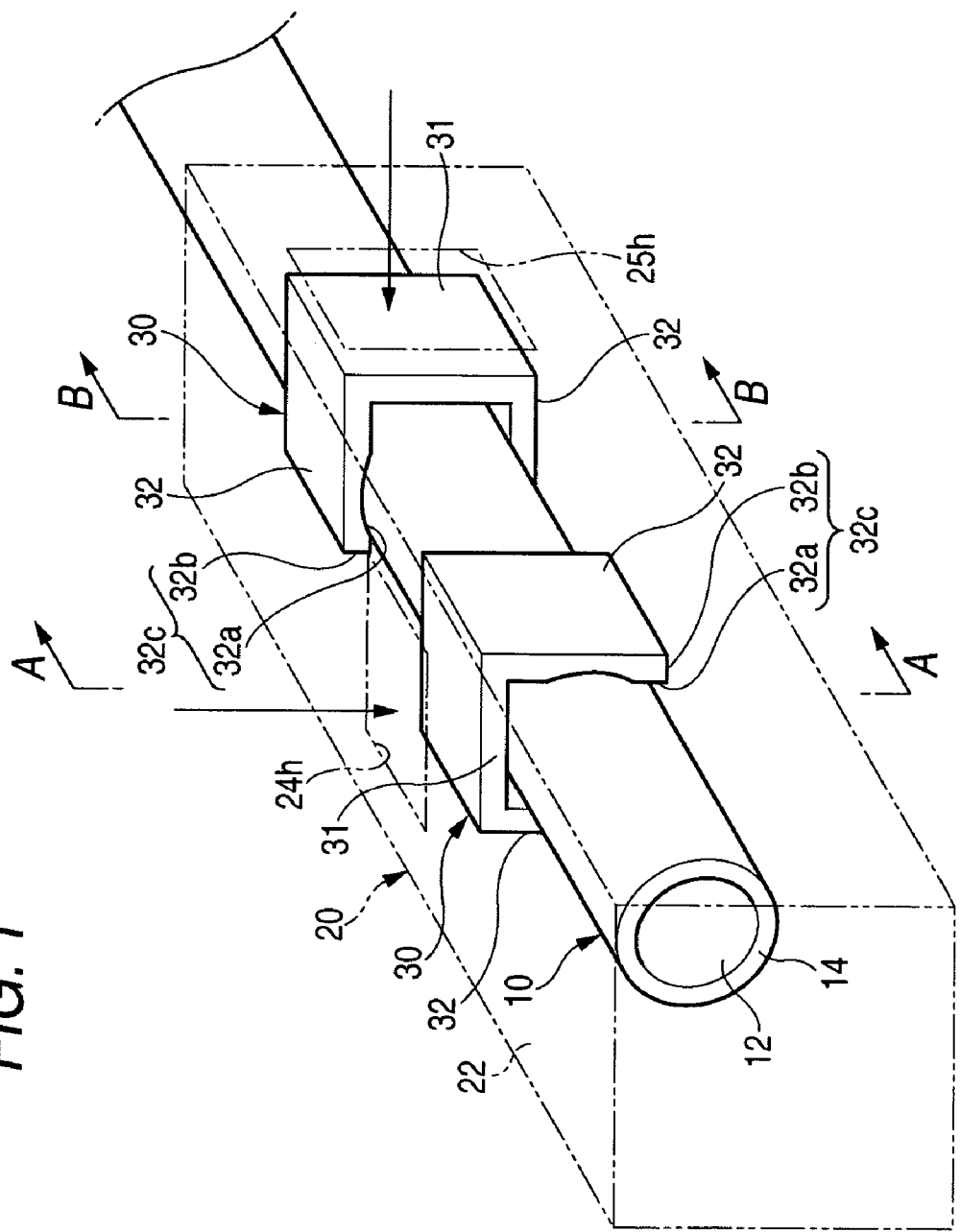
FIG. 1 is a perspective view showing an optical cable fixing portion structure according to an embodiment of the invention.
Figure 2A:
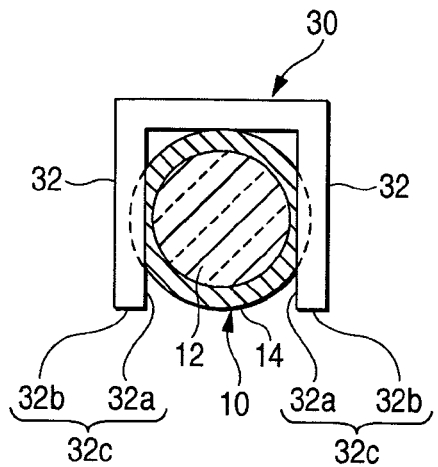
FIG. 2A is a sectional view taken along a line A-A of FIG. 1
Figure 2B:
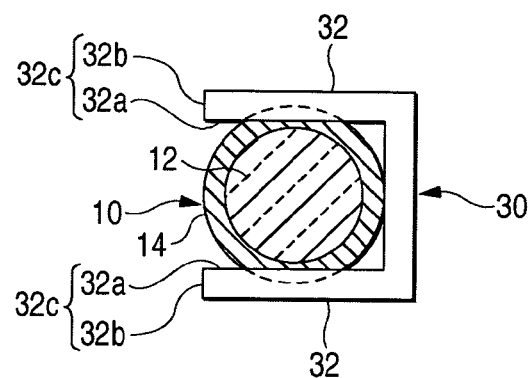
FIG. 2B is a sectional view taken along a line B-B of FIG. 1.

FIG. 1 is a perspective view showing an optical cable fixing portion structure, FIG. 2A is a sectional view taken along a line A-A of FIG. 1, and FIG. 2B is a sectional view taken along a line B-B of FIG. 1.

The optical cable fixing portion structure is a structure for fixing an optical cable 10 to an optical connector 20 and is provided with a plurality of stoppers 30.

The optical cable 10 is configured by covering a jacket 14 at an outer periphery of an optical fiber 12 having a core and a cladding. As a material of the jacket 14, it is preferable to use a resin having a comparatively large hardness of polypropylene species, polyamide species or the like in order to firmly engage the stopper 30, mentioned later, to the jacket 14. Further, the optical fiber 12 is exposed at a front end portion of the optical cable 10 as necessary.

The optical connector 20 optically couples the optical cable 10 to an optical cable of a connector on a counter side, or optically couples the optical cable 10 to an optical element of a light emitting element, a light receiving element or the like included in the optical connector 20.

The optical connector 20 is provided with a housing 22 formed by a resin or the like. The housing 22 may be formed substantially in a rectangular shape, or any other shape including rounded shapes. Inside of the housing 22 is formed with a holding hole (not illustrated) for inserting the optical cable 10 and the optical cable 10 is arranged to insert into the holding hole.

Further, two of stopper mounting guides, shown in this example as mounting holes 24h, 25h, are formed at the positions of the housing 22 at which the jacket 14 of the optical cable 10 is inserted. The respective stopper mounting holes 24h, 25h are formed at positions shifted from each other along a longitudinal or axial direction of the optical cable 10. The stopper mounting hole 24h on one side is opened to a first face (upper face in FIG. 1) of the housing 22 and the stopper mounting hole 25h on other side is opened to a second face (one side face in FIG. 1) substantially orthogonal to the first face of the housing 22. That is, the housing 22 includes a plurality of the stopper mounting holes 24h, 25h opened facing in directions perpendicular to the axial direction and different from each other. Specifically, two of the stopper mounting holes 24h, 25h, open facing directions shifted from each other substantially by 90 degrees centering on an axis core of the optical cable 10.

Further, the respective stoppers 30, mentioned later, are respectively mounted to fit into the stopper mounting holes 24h, 25h and the respective stoppers 30 are engaged with the jacket 14. Thereby, there is constructed a constitution in which the optical cable 10 is fixed to be held at a predetermined position at inside of the housing 22.

Further, other than the optical connector 20 mentioned here, also in a case of fixing the optical cable 10 directly to an optical plug or an electronic apparatus, similar fixing can be carried out.

Each of the stoppers 30 is made of a resin or a metal material, which has a hardness larger than that of the material of the jacket, and is provided with an outlook shape substantially in a U-like shape in which a pair of engaging pieces 32 is connected to be supported via a base portion 31.

The pair of engaging pieces 32 are formed substantially in a shape of a square plate and are arranged in parallel with each other by an interval dimension smaller than a width dimension of the jacket 14 (here, a diameter dimension of the optical cable 10) and larger than a width dimension of the optical fiber 12. Although optical cable 10 is shown in FIG. 1 as having a circular cross-section, it should be appreciated that the cable is not limited to such shapes, and that the width of the optical fiber 12 is not restricted to a diameter.

Figure 3:
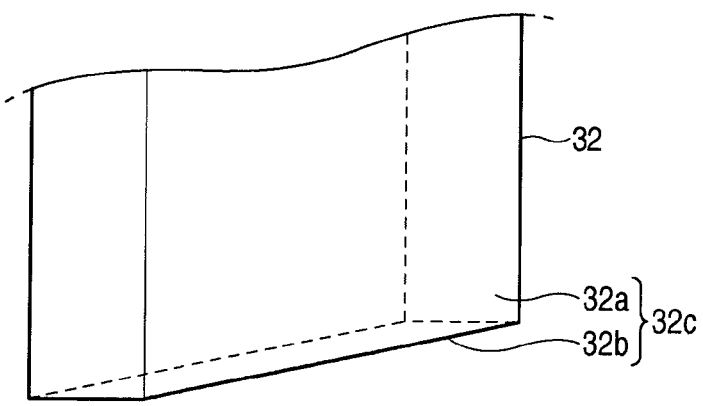
FIG. 3 is a perspective view enlarging a portion of an engaging piece.

Further, as shown by FIG. 1 through FIG. 3, front or leading end portions of the pair of engaging pieces 32 are formed having front end faces 32b substantially orthogonal to directions of the front ends. The pair of engaging pieces is respectively provided with blade portions 32c. The respective blade portion 32c are configured by intersecting the front end faces 32b of the pair of engaging pieces 32 and a pair of inner side faces 32a of the pair of engaging pieces 32 opposed to each other. The respective blade portions 32c are provided with edges extended in the axial direction of the optical cable 10.

Figure 6:
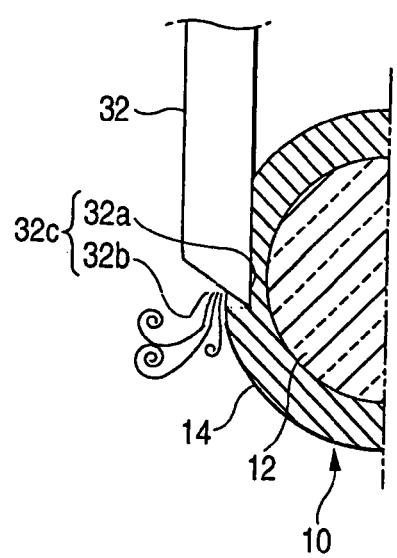
FIG. 6 is a sectional view showing a state in the midst of engaging an acute blade portion of the engaging piece with a jacket.

Further, although according to the embodiment, the opposed inner side faces 32a and the front end face 32b intersect each other substantially by a right angle, the opposed inner side face 32a and the front end face 32b may be intersected with each other by an acute angle or the like as shown in the alternative embodiment of FIG. 6. Further, a length of the edge of the blade portion 32c may be shorter than 1 mm or less. In sum, the blade portion 32c may be formed at a size and a shape to a degree of being capable of cutting into the jacket 14.

Further, the respective blade portions 32c are pressed to both side portions of the jacket 14 such that the jacket 14 of the optical cable 10 may be pressed between the pair of engaging pieces 32 of the stopper 30 from an opening side thereof, thereafter, further, the stopper 30 is pressed in a direction substantially orthogonal to the axial direction of the optical cable 10.

Figure 4:
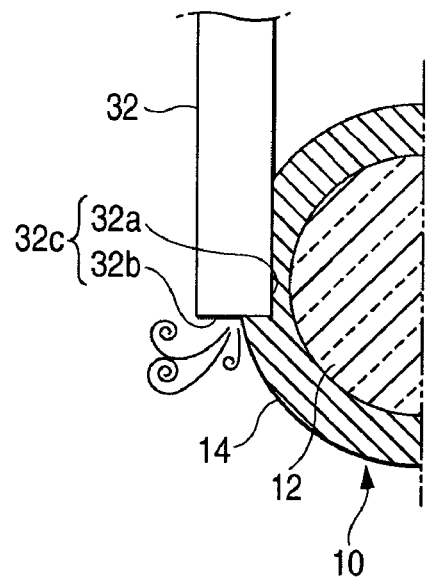
FIG. 4 is a sectional view showing a state in the midst of engaging the engaging piece with a jacket.

Then, as shown by FIG. 4, the blade portion 32c cuts into the both side portions of the jacket 14 in a shape of a flat chisel without pressing the jacket 14 to the optical fiber 12. Further, portions of the inner side face 32a of the pair of engaging pieces 32 opposed to each other are brought into the cut into portions of the jacket 14 to thereby construct a constitution of engaging the pair of engaging pieces 32 with the jacket 14.

Further, according to the embodiment, there is provided two of the stoppers 30 and the pairs of engaging pieces 32 of the respective stoppers 30 are engaged with the both side portions of the jacket 14 at positions different from each other along the longitudinal direction of the optical cable 10. Further, the both side portions of the jacket 14 are opposing side portions constituting a reference by the respective stoppers 30.

That is, the housing 22 is formed with the stopper mounting holes 24h, 25h at positions shifted from each other in the longitudinal or axial direction of the optical cable 10. Further, by inserting the respective stoppers 30 respectively to the stopper mounting holes 24h, 25h, the pairs of engaging pieces 32 of the respective stoppers 30 are engaged with the both side portions of the jacket 14 at positions different from each other along the longitudinal or axial direction of the optical cable 10.

Further, positions of engaging the pairs of engaging pieces 32 and the jacket 14 differ from each other in a peripheral direction of the optical cable 10 for the respective stoppers 30. In other words, pressing directions in engaging the respective stoppers 30 to the jacket 14 differ from each other. These peripheral directions are perpendicular to the axial direction of the optical cable 10 and are angularly oriented to differ between the respective stoppers 30 that are adjacent each other.

In this case, the positions of engaging the two stoppers 30 and the jacket 14 are shifted from each other by a quarter periphery in the peripheral direction of the optical cable 10. In other words, pressing directions in engaging the respective stopper 30 with the jacket 14 are substantially perpendicular to each other.

According to the embodiment, the housing 22 is formed with the stopper mounting hole 24h opened in an upper direction and formed with the stopper mounting hole 25h opened in one side direction. Further, by inserting the respective stoppers 30 respectively to the stopper mounting holes 24h, 25h, and pressing the stoppers 30 into the stopper mounting holes 24h, 25h from directions different from each other, the pairs of engaging pieces 32 and the jacket 14 are engaged with each other at positions different from each other along the peripheral direction of the optical cable 10 at the respective stoppers 30.

According to the optical cable fixing portion structure configured as described above, the positions of engaging the pairs of engaging pieces 32 and the jacket 14 differ from each other in the peripheral direction of the optical cable 10 for the respective stoppers 30 and therefore, even when the optical cable 10 is pulled, the force is received at the positions dispersed in the peripheral direction of the jacket 14. Therefore, the optical cable 10 can be fixed with a sufficient strength.

Further, the two stoppers 30 are used, the positions of engaging the pairs of engaging pieces 32 and the jacket 14 of the respective stopper 30 may be shifted from each other by the quarter of a full turn of the optical cable 10 with respect to (i.e., orthogonal to) the axial direction. Therefore, the force operated when the cable 10 is pulled or the like is received at the positions pertinently dispersed in the peripheral direction of the jacket 14. Therefore, the optical cable 10 can be fixed with a further sufficient strength by a comparatively simple constitution.

Further, the respective pairs of engaging pieces 32 are provided with the blade portions 32c configured by the inner side faces 32a opposed to each other and the front end face 32b disposed on the front end sides in the pressing direction, by pressing the stoppers 30, the blade portions 32c cut into the jacket 14, by bringing the inner side faces 32a opposed to each other to the cut into portions, the engaging pieces 32 are engaged with the jacket 14 and therefore, optical loss can be reduced by avoiding a compression force operated to the optical fiber 12.

Further, although according to the above-described embodiment, an explanation has been given of a mode of using the two stoppers 30, three or more of the stoppers 30 may be used and the stoppers 30 may be engaged with the jacket 14 at positions different from each other along the longitudinal or axial direction of the optical cable 10.

Positions of engaging the engaging pieces 32 of the plurality of stoppers 30 with the jacket 14 may be shifted from each other at a surrounding of a center axis of the optical cable 10 by a quarter periphery (90 degrees) or less or more.

For example, three of the stoppers 30 may be used, the positions of engaging the respective stopper 30 and the jacket 14 may be shifted from each other by a sixth of a full turn of the optical cable 10 with respect to (i.e., orthogonal to) the axial direction. In other words, pressing directions in engaging the respective stoppers 30 with the jacket 14 may be intersected from each other substantially by 60 degrees.

Further, although according to the embodiment, a description has been given of a mode of cutting into the jacket 14 by the engaging piece 32 to engage with the cut into portion, the engaging piece 32 may be formed in a shape of a knife blade and the engaging piece 32 in the shape of the knife blade may cut into the jacket 14 to engage with the jacket 14.

Figure 5:
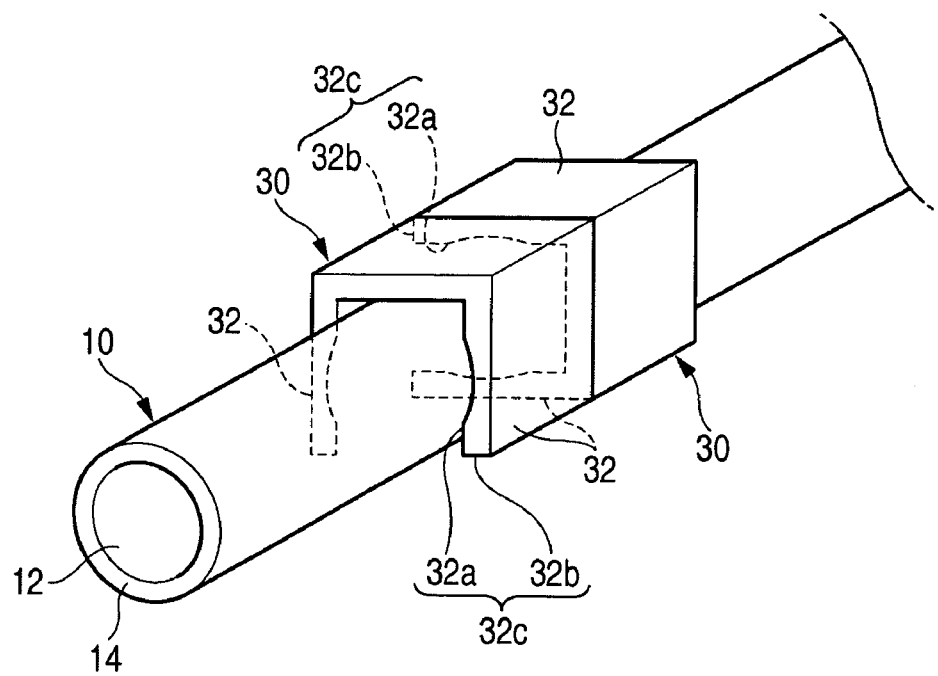
FIG. 5 is a perspective view showing a state of contiguously arranging a plurality of stoppers.

Further, as shown by FIG. 5, a plurality (shown as two in the drawing) of the stoppers 30 may contiguously be provided along the longitudinal or axial direction of the optical cable 10. Thereby, compact formation of the fixing portion structure is achieved. Even when the plurality of stoppers 30 are proximately arranged in this way, a force of the respective stoppers for fixing the jacket 14 may be pertinently dispersed in the peripheral direction of the jacket 14 and therefore, the invention is effective particularly in that the optical cable 10 can be fixed by the sufficient strength.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. An optical cable fixing portion structure for fixing an optical cable having an optical fiber covered with a jacket, the optical cable fixing portion structure comprising:
   a plurality of stoppers having respective pairs of engaging pieces arranged in parallel with each other at an interval dimension smaller than a width dimension of the jacket, whereby,
   the pairs of engaging pieces are engageable with opposing side portions of the jacket;
   a housing comprising (i) an optical cable holding hole that receives the optical cable, and (ii) a plurality of stopper mounting guides, each stopper mounting guide receiving a respective one of the stoppers and guiding the respective stopper in a direction substantially orthogonal to an axial direction of the optical cable, and in an orientation in which the pairs of engaging pieces are engageable with opposite side portions of the jacket, wherein a first one of the stopper mounting guides orients a first one of the stoppers in a first angular orientation with respect to a direction transverse to the axial direction of the optical cable, and a second one of the stopper mounting guides orients a second one of the stoppers in a second angular orientation with respect to the transverse direction of the optical cable, the second angular orientation being different from the first angular orientation to disperse a fixing force of the engaging pieces about the circumference of the optical cable, the respective pairs of engaging pieces include blade portions having edges defined by an intersection of (i) inner side faces thereof opposed to each other and (ii) leading end faces thereof disposed at leading ends in a direction of pressing the pairs of engaging pieces into engagement with the jacket, and the blade portions cut into the jacket when the engaging pieces are pressed into engagement with the jacket, wherein the plurality of stopper mounting guides are arranged adjacent in the axial direction of the optical cable so adjacent ones of the plurality of stoppers are substantially contiguous.

2. The optical cable fixing portion structure according to claim 1, wherein the first angular orientation differs from the second angular orientation by about 90 degrees with respect to the transverse direction of the optical cable.

3. The optical cable fixing portion structure according to claim 1, wherein the edges form acute angles.

4. The optical cable fixing portion structure according to claim 1, wherein the respective stoppers are made of a resin material having a hardness larger than that of a material making up the jacket.

5. The optical cable fixing portion structure according to claim 1, wherein the engaging pieces are formed substantially in the shape of a square along the longitudinal direction with each side being substantially equal to the diameter of the jacket.

6. An optical cable fixing portion structure for fixing an optical cable having an optical fiber covered with a jacket, the optical cable fixing portion structure comprising:

a housing through which the optical cable is disposed along an axial direction of the optical cable, the housing having a plurality of side portions, each side portion of at least some of the side portions having an opening;

a plurality of stoppers disposed at respective positions along the axial direction, each being at substantially different angular orientations with respect to a direction transverse to the axial direction, each stopper of the plurality of stoppers being sized to traverse through a respective opening of the housing and having a pair of parallel engaging pieces at an interval dimension smaller than a width dimension of the jacket to engage opposite side portions of the jacket, wherein each respective stopper is forced between the respective opening and the jacket in a direction substantially orthogonal to the axial direction to disperse a fixing force of the engaging pieces about the circumference of the optical cable, wherein the engaging pieces are formed substantially in the shape of a square along the longitudinal direction with each side being substantially equal to the diameter of the jacket.

7. A method for fixing, with respect to a housing having first and second mounting guides, an optical cable having an optical fiber covered with a jacket, using a plurality of stoppers having pairs of engaging pieces arranged in parallel with each other at an interval dimension smaller than a width dimension of the jacket, the method comprising:

inserting the optical cable into the housing;

inserting a first one of the stoppers into the first mounting guide of the housing in a first direction substantially orthogonal to an axial direction of the optical cable, in an orientation in which the pairs of engaging pieces are engageable with opposite side portions of the jacket, and in a first angular orientation with respect to a direction transverse to the axial direction of the optical cable; and inserting a second one of the stoppers into the second mounting guide of the housing in a second direction substantially orthogonal to the axial direction of the optical cable, in an orientation in which the pairs of engaging pieces are engageable with opposite side portions of the jacket, and in a second angular orientation with respect to the transverse direction of the optical cable, the second angular orientation being substantially different from the first angular orientation direction to disperse a fixing force of the engaging pieces about the circumference of the optical cable, wherein the engaging pieces are formed substantially in the shape of a square along the longitudinal direction with each side being substantially equal to the diameter of the jacket.

8. An optical cable fixing portion structure for fixing an optical cable having an optical fiber covered with a jacket, the optical cable fixing portion structure comprising:

a plurality of stoppers having respective pairs of opposed engaging pieces arranged in parallel with each other at an interval dimension smaller than a width dimension of the jacket, whereby the pairs of engaging pieces are engageable with opposing side portions of the jacket and are formed substantially in the shape of a square along the longitudinal direction with each side being substantially equal to the diameter of the jacket, wherein a first one of the stoppers is oriented in a first angular orientation with respect to a direction transverse to an axial direction of the optical cable, and a second one of the stoppers is oriented in a second angular orientation with respect to the transverse direction of the optical cable, the second angular orientation being substantially different from the first angular orientation direction to disperse a fixing force of the engaging pieces about the circumference of the optical cable.

9. The optical cable fixing portion structure according to claim 8, wherein the plurality of stoppers are arranged adjacent in the axial direction of the optical cable so adjacent ones of the plurality of stoppers are substantially contiguous.

10. The optical cable fixing portion structure according to claim 8, further comprising:

a housing comprising (i) an optical cable holding hole that receives the optical cable, and (ii) a plurality of stopper mounting guides, each stopper mounting guide receiving a respective one of the stoppers and guiding the respective stopper in a direction substantially orthogonal to the axial direction of the optical cable, and in an orientation in which the pairs of engaging pieces are engageable with opposite side portions of the jacket, wherein:

a first one of the stopper mounting guides orients the first one of the stoppers in the first angular orientation, and a second one of the stopper mounting guides orients the second one of the stoppers in the second angular orientation being different from the first angular orientation.

11. The optical cable fixing portion structure according to claim 10, wherein the plurality of stopper mounting guides are arranged adjacent in the axial direction of the optical cable so adjacent ones of the plurality of stoppers are substantially contiguous.

* * * * *